United States Patent
Metzler et al.

(10) Patent No.: US 10,041,793 B2
(45) Date of Patent: Aug. 7, 2018

(54) PROVIDING A POINT CLOUD USING A SURVEYING INSTRUMENT AND A CAMERA DEVICE

(71) Applicant: HEXAGON TECHNOLOGY CENTER GMBH, Heerbrugg (CH)

(72) Inventors: Bernhard Metzler, Dornbirn (AT); Alexander Velizhev, St. Gallen (CH); Thomas Fidler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 168 days.

(21) Appl. No.: 15/132,837

(22) Filed: Apr. 19, 2016

(65) Prior Publication Data
US 2016/0314593 A1  Oct. 27, 2016

(30) Foreign Application Priority Data
Apr. 21, 2015 (EP) .................................... 15164442

(51) Int. Cl.
*G06K 9/00* (2006.01)
*G01C 15/00* (2006.01)
(Continued)

(52) U.S. Cl.
CPC ........... *G01C 15/002* (2013.01); *G06K 9/629* (2013.01); *G06T 7/337* (2017.01); *G06T 7/38* (2017.01);
(Continued)

(58) Field of Classification Search
CPC ....... G01C 15/002; G06T 7/579; G06T 7/337; G06T 7/0044; G06T 2207/10028; G06T 2207/20221; G06K 9/629; H04N 5/23238
(Continued)

(56) References Cited

U.S. PATENT DOCUMENTS

| 9,772,185 B2 | 9/2017 | Metzler | |
|---|---|---|---|
| 2008/0075326 A1* | 3/2008 | Otani | G01C 3/00 |
| | | | 382/106 |
| 2012/0148162 A1* | 6/2012 | Zhang | G06T 7/11 |
| | | | 382/195 |
| 2014/0163775 A1 | 6/2014 | Metzler | |
| 2014/0300886 A1* | 10/2014 | Zogg | G01C 15/002 |
| | | | 356/4.01 |

(Continued)

FOREIGN PATENT DOCUMENTS

| CN | 103477187 A | 12/2013 |
|---|---|---|
| EP | 1 903 303 A2 | 3/2008 |

OTHER PUBLICATIONS

El-Omari, S., "Integrating 3D laser scanning and photogrammetry for progress measurement of construction work", Automation in Construction, vol. 18, Issue 1, Dec. 2008.

(Continued)

*Primary Examiner* — Van D Huynh
(74) *Attorney, Agent, or Firm* — Maschoff Brennan

(57) ABSTRACT

Some embodiments of the invention include a method for providing a 3D-point cloud using a geodetic surveying instrument. Some embodiments also include an image capturing unit. A method, according to some embodiments may include scanning a surrounding with the surveying instrument according to a defined scanning region with at least partly covering the object and generating a scanning point cloud corresponding to the scanning region with reference to a surveying coordinate system which is defined by the surveying instrument and generating a first image on side of the surveying instrument covering a region basically corresponding to the scanning region, the first image representing a reference image the pose of which is known with reference to the surveying coordinate system due to the position and orientation of the surveying instrument for acquiring data the first image is base on.

20 Claims, 9 Drawing Sheets

(51) Int. Cl.
*H04N 5/232* (2006.01)
*G06K 9/62* (2006.01)
*G06T 7/33* (2017.01)
*G06T 7/38* (2017.01)
*G06T 7/521* (2017.01)
*G06T 7/579* (2017.01)

(52) U.S. Cl.
CPC .............. *G06T 7/521* (2017.01); *G06T 7/579* (2017.01); *H04N 5/23238* (2013.01); *G06T 2207/10016* (2013.01); *G06T 2207/10024* (2013.01); *G06T 2207/10028* (2013.01); *G06T 2207/30181* (2013.01); *G06T 2207/30244* (2013.01)

(58) Field of Classification Search
USPC ......................................................... 382/109
See application file for complete search history.

(56) References Cited

U.S. PATENT DOCUMENTS

2016/0138919 A1* 5/2016 Green ..................... G06T 17/00
348/135
2017/0091923 A1* 3/2017 Siercks ................. G06T 7/0004

OTHER PUBLICATIONS

European Search Report dated Sep. 29, 2015 as received in Application No. EP 15164442.
Kim, H., "Evaluation of 3D Feature Descriptors for Multi-modal Data Registration", International Conference on 3D Vision—3DV 2013, Jun. 29-Jul. 1, 2013, pp. 119-126.

\* cited by examiner

PROVIDING A POINT CLOUD USING A SURVEYING INSTRUMENT AND A CAMERA DEVICE

FIELD

Some embodiments of the present invention relate to a method and a system for providing a point cloud of an object by use of a geodetic device, particularly a laser scanner, and a structurally separated camera.

BACKGROUND

For gathering dimensional information about an object, particularly of topographical information, the surface of such object typically may be scanned using a laser beam which is moved over the object in a predefined manner. Precise scanning of the object for instance is provided by a geodetic measuring device like a terrestrial laser scanner or a total station, e.g. Leica P20, Leica Multi Station 50. By scanning the object a so called (3D-) point cloud is created representing the object by an amount of points with defined positions in a common coordinate system.

The point cloud is derived by determining a distance for each measuring point and a correlated direction of the laser beam when determining the distance. The point-to-point resolution of such measuring points and the resulting point cloud, respectively, is defined by the speed of moving the laser beam on the surface and a triggering-interval for triggering single measurements (e.g. one for each measuring point).

In addition to generating the point cloud there often is captured an image of the object by a capturing unit of the geodetic measuring device. The image provides further information concerning the object, e.g. concerning colours or textures of the object.

As from one station point usually only a part of the object is measurable while other surface points are hidden, it becomes necessary to set up the measuring devices at least at two different positions with respect to the object such that in combination the whole surface of the object is measurable.

The surveying instrument needs direct line-of-sight to the object points to measure. In case of an obstruction, e.g. a tree in front of a building which occludes a part of the façade leads to a so called "scanning shadow" (see FIG. 1a). In practice, in such a case the surveying instrument also is set up at a different position where direct line-of-sight to the missing parts is given. Therefore, more than one setup of the surveying instruments is needed and each additional setup takes time and reduces the productivity of the user.

Moreover, a full-dome-scan, i.e. a scanning area from 0° to 360° in horizontal and −45° to 90° in vertical direction, with a terrestrial laser scanner in highest resolution may take up to several hours. In this resolution the distance between the points in 100 meters is 1.0 mm. For every new setup of the instrument a full 360° panorama image is usually obtained which also takes several minutes. Thus, relocating a laser scanner or a similar surveying instrument (e.g. total station) and recording a second set of measuring data (second point cloud) is very time consuming and needs an expert at least for referencing the first point cloud relative to the second point cloud.

EP 1 903 303 B1 discloses a method of combining point cloud data with image data in order to fill up missing parts of the point cloud. The camera unit is used for recording a set of images which are split into a set of stereoscopic image pairs. Every image pair is processed independently. Moreover, the panorama image obtained by a laser scanner (the so-called "main image") is used for pair wise matching with one stereoscopic image pair and thus providing adding dimensional information of the respective stereoscopic image pair to the point cloud. The whole process is performed in a post-processing step having all data of the set of images and the laser scanner ready for processing.

Several below mentioned methods for registration of point clouds are known, e.g. marker-based or image-based registration first for coarse registration and afterwards geometry-based registration (iterative closest point) for fine adjustment:

Marker-Based Registration:

A user places three or more markers around an object. The positions of the markers are measured with the surveying instrument—either by a reflector-less measurement onto the marker or with a surveying pole or by scanning.

These markers are scanned using a laser scanner or total station and also each marker should be visible at least on one image or video frame from the mobile camera unit. Such coded markers are detected automatically (preferred), alternatively manually, in laser-based point cloud or panorama image and on images from the mobile camera unit.

Correspondences between marker positions in image-based and laser-based coordinate frames are used for registration.

In case of non-coded markers the identification of corresponding markers positions can be carried out automatically by analyzing the distances between marker pairs.

Image-Based Registration:

The registration task might be solved by finding a set of common points in images, using image processing. The fact corresponding points on images are related with 3D points is used to compute Helmert transformation. At least three of the measured image points should have corresponding 3D points in the associated point clouds.

Geometry-Based Registration:

The registration task might be solved by finding a set of common points in point clouds e.g. using 3D feature descriptors. Alternatively, a geometry based method might be used for registration. Two registered point clouds should cover overlapping object surfaces. Such methods are comparing geometric similarity between point clouds to find an optimal transformation.

Manual Registration:

Here, three or more common points in image-based and laser-based point cloud are selected manually, e.g. by displaying the point clouds and enabling the user to pick the corresponding points. The registration task is solved by computing of rigid motion (or Helmert) transformation using common point correspondences.

A main disadvantage of above method is that due to the post-processing and due to the independent processing of the stereoscopic images an error concerning the accuracy of point positions increases with the number of images not being directly related to the scanning point cloud. Moreover, a compensation of position errors emanating from the stereoscopic image processing subsequent to the capturing process is not possible or possible only to a minor. Additionally, the processing according to the state of the art needs to be performed in a post-processing manner, i.e. not in the field directly in the course of the measurement, and thus, the user cannot be provided with actual information regarding e.g. a quality of the performed measurements.

SUMMARY

Some embodiments of the present invention provide a method and system for enabling data processing in the field (directly during the measuring process) and providing a user with real-time measuring data in order to improve efficiency of the measuring process.

Some embodiments of the invention provide an improved method for generating a common point cloud of an object directly in the field, particularly during a measuring process, wherein data gathered with separated devices for data acquisition is considered for generating the point cloud.

Some embodiments of the invention provide a method and system for enabling more flexible and easier measuring of objects, in particular from all sides.

Some embodiments of the invention relate to the use of a geodetic surveying instrument together with a mobile image capturing unit (e.g. mobile digital camera), wherein images recorded by the surveying instrument and the image capturing unit are automatically processed all together within a Structure-from-Motion- (SfM) or a SLAM-algorithm. Thereby, a referencing of image data provided by the image capturing unit relative to a coordinate system defined by the surveying instrument can be provided with execution of the Structure-from-Motion- (SfM) or a SLAM-algorithm automatically and directly, i.e. position information provided by the surveying instrument is used as input for the Structure-from-Motion- (SfM) or a SLAM-algorithm so that each data computed or derived with that algorithm also comprises respective position information without the need of an additional scaling step.

Some embodiments of the invention relate to a method for providing a 3D-point cloud, in particular of an object, using a geodetic surveying instrument, in particular a laser scanner or total station, and an image capturing unit. The method comprises the scanning of a surrounding with the surveying instrument according to a defined scanning region (e.g. with at least partly covering the object) and generating a scanning point cloud corresponding to the scanning region with reference to a surveying coordinate system which is defined by the surveying instrument. Consequently, the scanning point cloud comprises an amount of 3D-points, which represent the surrounding and e.g. at least a part of the object, and is referenced in a given surveying coordinate system.

Some embodiments of the invention include, a first image that is generated on the side of the surveying instrument covering a region at least basically corresponding to the scanning region, wherein the first image represents a reference image the pose of which is known with reference to the surveying coordinate system due to the (known) position and orientation of the surveying instrument (in the surveying coordinate system) for acquiring data the first image is based on. The reference image can be represented by a visual image captured by a camera of the surveying instrument or can be derived from intensity values of the scanning point cloud in form of an artificial image. As the surveying coordinate system is defined by the surveying instrument and the camera is assigned to that instrument, the pose of the reference image based on a camera image regarding the surveying coordinate system is known.

In some embodiments, the first image can be a single image, a set of camera images (e.g. a mosaic of images like cubical image), or a panorama image which is the result of a combination of a set of single images. In all cases the pose or the poses are given in the coordinate system of the surveying instrument.

In some embodiments, a first series of at least two images is captured with the image capturing unit from respective poses, the images of the first series of at least two images partly covering the scanning region, i.e. a part of the region which is covered by the first image as well, and an imaging region. Thus, these images are captured so that an additional area, e.g. of the object, which is not covered by the first image is covered as well (e.g. a scanning shadow).

In some embodiments, a Structure-from-Motion- (SfM) or a SLAM-algorithm is applied at least comprising identifying a first set of image points based on the reference image and the first series of at least two images, the image points representing a first set of reference points of a reference point field, wherein each point of the first set of reference points appears in the reference image and in at least one of the images of the first series of at least two images. In particular, identical (homologous) points of the captured surrounding are identified in the images. Position information regarding the points of the first set of reference points is provided by the scanning point cloud.

In some embodiments, the poses for the images of the first series of at least two images are determined with reference to the surveying coordinate system, in particular based on resection, using the first set of reference points and the position information (provided by the scanning point cloud), the poses representing positions and orientations of the image capturing unit relative to the surveying instrument at capturing the images of the first series of at least two images.

In some embodiments, those two images are captured with the image capturing unit, the two images also being referenced to the coordinate system of the surveying instrument by use of the SLAM- or SfM-algorithm.

Some advantages of the method according to some embodiments of the invention is that the position information which is originally provided by the surveying instrument is considered with the Structure-from-Motion- (SfM) or the SLAM-algorithm. Thus, the poses for the images of the first series of images (and poses and positions derived by further processing steps) can directly be determined with known positions and/or orientations relative to the reference coordinate system (scanning coordinate system). Consequently, possibly determined further points—by use of these images and their poses—can be derived with precise position information as to the reference coordinate system, as well.

A further referencing or scaling step is no longer necessary for such data.

In some embodiments, the reference points (with position information from the surveying instrument) form a framework for the pose estimation of the images captured with the camera device. Drifts that result from error propagation when consecutively aligning one image to another image can be reduced by introducing global constraints from that reference points.

In context of the present invention "reference points" are to be understood as points which are defined by performing the method according to the invention, i.e. which are particularly derived by some kind of image processing based on at least two images and which are given e.g. by some prominent features lying in the field of view of the camera, e.g. reference points are derived by identification of homologous points in at least two images. Thus, such points are not to be understood as points which are initially known, e.g. comparing points used for setting up a geodetic measuring device (based on which an absolute position and orientation of such device is determinable).

In other words, a point cloud is acquired with the surveying instrument (with corresponding image data=reference image). Additionally, a series of at least two images is captured with the camera module. A first set of 3d-points (R1, R2, R3) is generated, i.e. particular points visible in images of the series of at least two images and the reference image. The corresponding depth value for those points is derived from the scanning data. The poses of a first set of images of the series of at least two images are computed based on the first set of 3d-points (R1, R2, R3), particularly by resection. A second set of 3d-points (S1, S2, S3) is generated based on homologous points in the first set of images of a series of at least two images with known poses by forward intersection. The poses of further images of the series of at least two images may be computed based on the second set of 3d-points (S1, S2, S3) or based on a combination of the first set of 3d-points (R1, R2, R3) and second set or 3d-points particularly by resection. The last two steps may be repeated until substantially the poses of all images of the first series of at least two images are determined.

According to some embodiments of the invention the field of view of the camera of the surveying instrument overlaps with or basically corresponds to a standard scanning region, wherein the camera of the surveying instrument is built as an overview camera providing a field of view of up to 360° horizontally and up to 270° vertically. Alternatively, the camera is built as an on-axis camera with a smaller field of view. Particularly, a set of images are taken to cover the whole scanning region.

According to some embodiments, a defined part of the object is commonly covered by the reference image and by a second image. Alternatively, both images cover different parts (without an overlapping region) of the object but both also cover an identical region of the surrounding (background).

According to some embodiments of the invention the image capturing unit (camera module) contains a camera and particularly a processing (and controlling) unit and a display. Additionally, it may contain a data transmission unit. The camera is mobile and is not fixed to a surveying (scanning) instrument body. Additionally, it could contain a GNSS receiver module. Additionally or alternatively, it may contain an inertial measurement unit. Additionally or alternatively, it may contain a surveying reflector which position is measurable by tracking using a total station (e.g. Leica Multi Station 50) or tracker (e.g. Leica Absolute Tracker AT901). Additionally or alternatively, it may contain internal data storage for saving all input data on the image capturing unit.

In some embodiments, the image capturing unit can be on side of a controller for a laser scanner, total station or a GNSS measurement system. In that case the measured data, e.g. coordinates of reference targets, can be directly transmitted e.g. via radio or cable from the total station or the GNSS system to the controller and thus being directly integrated in the processing.

According to some embodiments of the invention, particularly, the computation (e.g. SLAM-algorithm) can be carried out on the processing unit of the image capturing unit.

Alternatively, the processing unit is located at the surveying instrument or integrated in a further mobile processing device and data is transmitted from and to the processing unit as known from the state of the art, e.g. via radio or cable (e.g. WiFi, Bluetooth etc.). Alternatively, the data can be transferred to a computation server which can be a computer or a smart-phone located close to the camera module or a server connected to the internet (cloud computing).

The image capturing unit may—according to a specific embodiment of the invention—comprise 4-6 cameras which are fixed in the body of the camera unit, e.g. being built as a panorama camera.

The image capturing unit can—according to another specific embodiment of the invention—consist of a single camera. Particularly, the image capturing unit comprises an omni-directional (panorama) camera.

The image capturing unit may have an integrated scanning device, e.g. a profiler or a scanner based on pattern projection, or the capturing unit may be built as a rim-camera. The capturing unit provides at least a (preferably visual) camera image which represents a respective basis for pose determination. Moreover, such specific capturing unit particularly provides a depth image or local point cloud being generated on side of the capturing unit. Such local point cloud may be merged with the global point cloud initially provided by the surveying instrument based on the SfM- or SLAM-algorithm described above, i.e. determining relative poses.

Furthermore, the capturing unit may comprise an IMU (inertial measuring unit) for continuously providing changes of its position and orientation (pose) and thus providing pose interpolation with respect to two successive camera images which the poses are determined on. Hence, such IMU data enables to more precisely gather depth information with the scanning device in-between respective pose calculations or to correct scanning data acquired accordingly.

In some embodiments, the image capturing unit can be designed so that it can be carried by an unmanned aerial vehicle (UAV), e.g. the image capturing unit comprises a specific coupling element.

An UAV with such capturing unit enables to automatically detect a gap in a point cloud of a scanning scene (on side of the surveying instrument), to automatically control the UAV (e.g. by using GNSS-signals or remote-controlled by the surveying instrument) for approaching an area in the scene which corresponds to the identified gap and to acquire respective measuring data with the capturing unit related to the gap.

According to a further embodiment of the invention, a second set of reference points is determined in an imaging region based on the poses for the images of the first series of images, in particular by forward intersection, wherein the imaging region is different from the scanning region (of course some overlap is possible) and a position information regarding a 3D-position of at least one point of the second set of reference points is derived, the position information being referenced to the surveying coordinate system. In particular, the scanning point cloud is actualised by adding the derived 3D-position information to the scanning point cloud.

As the second and the third image (as part of the first series of at least two images) both (only) partly cover the scanning region and additionally commonly cover a different imaging area, such processing of image information of the second and third images provides to derive 3D-positions of points, which lie not inside the scanning region. 3D position information can be derived which enables to extend the scanning point cloud regarding its covered region, e.g. regarding its dimensions, which for instance enables to fill gaps which are given or have occurred by scanning the surrounding (scanning shadow). Additional 3D position information determined in that way automatically is referenced (is present) in the surveying coordinate system (without need of further referencing steps). Moreover, the derived 3D-position information provides a basis for subsequently identified reference points of a further set of reference points so that respective positions information can be assigned to such subsequent reference points (and further poses for subsequent images can be calculated by use of these subsequent reference points).

Thus, as a further embodiment of the present invention, a second series of at least one image is captured with the image capturing unit, wherein the at least one image of the second series of at least one image at least partly covers the second set of reference points and/or at least one point of the first set of reference points. Moreover, the pose for the at least one image of the second series is determined with reference to the surveying coordinate system, in particular based on resection, using at least three reference points of the first and/or the second set of reference points (which means in sum at least three reference points in particular being partly associated to the first and the second set of reference points) covered with the at least one image and using respective position information.

In particular, the pose for at least one image of the second series of images is determined with reference to the surveying coordinate system solely using reference points of the second set of reference points.

According to a specific embodiment of the invention, at least one of the images of the second series of at least one image partly covers the scanning region, wherein a further reference point is determined based on the reference image and the at least one of the images of the second series of at least one image.

With view to providing high precise position data, a bundle adjustment procedure can be applied based on the poses of the images of the first series of at least two images, the second series of at least one image and the first and the second set of reference points, in particular the further reference point and/or the scanning point cloud data.

Using an above Structure-from-Motion- (SfM) or SLAM-algorithm provides for considering more than one image captured with the mobile image capturing unit. The pose for each image of the series of images can be determined and, thus, an extended image-based point cloud can be generated using the image data of at least two of those images. The poses may be determined on bases of known position information of reference point given by the initial scanning point cloud which was generated with the surveying instrument but, alternatively or additionally, such positions information of reference points is created by forward intersection using at least two images taken with the image capturing unit (after the poses for such images were calculated again based on the position information provided by the scanning point cloud). It is to be understood that such reference points not necessarily lie within the (or are part of) the scanning region/scanning point cloud, but particularly lie outside the scanning region and are identified in the at least two images as homologous points.

Particularly, the poses of the images taken with the image capturing device are calculated using position information for the reference points, the position information being provided by the scanning point cloud (both being possible: position information generated by the surveying instrument and/or derived by forward intersection using at least two images), in particular wherein a scaling regarding the surveying coordinate system automatically is provided by using position information with each processing step, particularly regarding positions of the reference points and/or of the image capturing unit.

By use of such position information preferably a scaling for a point cloud to be generated on basis of the image data provided by a series of images (image-based point cloud) is available. Moreover, the position of the image capturing unit relative to the surveying instrument (at the moment of capturing the respective image) can be determined exactly and absolutely (in the surveying coordinate frame).

Concerning the generation of position information of points going beyond the data of the scanning point cloud, a specific embodiment of the invention relates to such calculations being performed as follows: based on the poses of the reference image and at least one further image, an information regarding a 3D-position of a point of the object is derived by forward intersection using the reference image and at least the further image and the scanning point cloud is actualised by adding the derived position information to the scanning point cloud. Particularly, the scanning point cloud is extended by the derived information regarding a 3D-position of the point. Such calculation particularly is performed by executing a respective algorithm implemented for performing above steps.

Alternatively or additionally—according to a further embodiment of the invention—a point cloud may be generated based on the surveying image and mobile images. With other words, an image point cloud is computed, in particular by applying a dense-matching algorithm, for at least a part of the imaging region based on the poses of at least two of the images captured with the image capturing unit (20,22), in particular by forward intersection, the image point cloud at least comprises 3D-position information according to a respective commonly covered region of the at least two captured images, in particular of the object, and is referenced with respect to the surveying coordinate system.

The calculation of such image point cloud is particularly provided by execution of a dense matching algorithm, wherein such dense matching algorithm particularly is implemented as a separate algorithm or is combined with (integrated in e.g. as a dense optical flow algorithm) the Structure-from-Motion- (SfM) or SLAM-algorithm. Particularly, such dense matching is performed in a separate step after having executed the Structure-from-Motion- (SfM) or SLAM-algorithm.

By using at least two images, which are captured with the image capturing unit and both covering a common part of the object not covered by the surveying instrument, for execution of the Structure-from-Motion- (SfM) or SLAM-algorithm, particularly of a dense matching algorithm, additional 3D-positions of points (of the object) can be derived, the 3D positions of the points already are referenced to the surveying coordinate system.

By additionally use of the position information from the scanning point cloud—as to the invention—with image-based deriving of position data provides for more precise (and already scaled) determination of 3D-positions and for the possibility to continuously and instantaneously compensate position data respectively.

In that context, according to another specific embodiment of the invention, position errors, which occur with calculating the 3D-position information or the poses of the images are compensated on basis of scanning point cloud data, wherein the compensation is performed for each successive image data provided by successively captured images with the image capturing unit.

Thus, the compensation of 3D-positions of points (derived by forward intersection using at least two images, particularly initially the reference image and two more images) can be applied directly after gathering respective image data, i.e., initially, point positions which are derived on basis of image data from the first series of images are compensated using information provided by the scanning point cloud. When capturing a further (third) image (second series of images) and using respective further image data for deriving new (additional) 3D-points based on forward intersection using the first series of images, the positions of such new 3D-points are compensated considering the already compensated point positions of the previous compensation step (for the further image) and/or considering the information provided by the scanning point cloud—depending on respective reference points (included in the point cloud and/or identified in the further image) being used for determination of the pose of one image of the second series of images.

In particular, with view to user-guidance, according to a further embodiment of the invention, quality information concerning the position accuracy of points of the scanning point cloud and of points of the image point cloud is generated. Therefore, the user or the system is enabled to introduce further measuring steps (e.g. filtering of data or capturing of additional images) for providing measuring data fulfilling defined measuring conditions.

In that context, according to a specific embodiment of the invention, the quality information is displayed in an image, wherein a first region (of the image) representing the scanning point cloud is overlaid by a first marking and a second region representing the image point cloud is overlaid by a second marking, the markings particularly being represented by regions of different colours. According to such output, the user is enabled to decide whether or not further measuring steps are to be performed in order to complete the measuring process regarding given requirements.

Particularly, a region covered by both the scanning and the image point cloud is overlaid by a third marking or the points of the region covered by both the scanning and the image point cloud are filtered so that only points of the scanning point cloud or only points of the image point cloud are provided by a resulting point cloud, wherein the filtering is induced by an input of an operator.

According to above embodiments, the operator directly (during performing the measuring steps, particularly during capturing additional images) can see on the display which regions of interest are already measured, i.e. covered by the images and of a calculated points cloud, and which point-to-point accuracy is achieved for particular regions. Moreover, the user can decide depending on accuracy requirements which source of point data should be used for generating a resulting point cloud.

Regarding the time aspect of scanning the surrounding, capturing images and performing the processing algorithm—according to the invention—the method (i.e. each step of the method) is conducted directly and instantaneous, particularly automatically, during a measuring process, wherein data processing, particularly regarding the Structure-from-Motion- (SfM) or the SLAM-algorithm, is performed by a processing unit during the measuring process. The processing unit receives data with respect to the scanning of the surrounding, capturing of the first image with the camera of the surveying instrument and capturing of at least two further images with the image capturing unit.

Contrarily to solutions known from prior art, here the proceeding of all data is performed directly in the field during performing the measurement. Prior art teaches a post-processing of data gathered in the field, wherein no on-line feedback can be generated e.g. in order to provide a user with real-time measuring information. As one big advantage of the present invention the continuous consideration of continuously added image data to the set of data to be processed, enables for on-line and more precise compensation of image-based position data.

Concerning the user guidance, according to a particular embodiment of the invention, a live-image is displayed on side of the image capturing unit imaging an actual field of view of the image capturing unit, wherein a region which both is actually imaged by the image capturing unit and also is (already) covered or uncovered by the scanning point cloud is marked in the live-image.

Particularly, a part of the object being covered by one of the images captured with the image capturing unit is marked in the live-image.

By such displaying and overlying an actual image by respective information about which parts of the actual image are already covered e.g. by the scanning or the image point cloud, a completeness-check is provided to the user and helps the user to plan further measuring steps.

I.e. the user can live see the scanning point cloud in combination with the growing image point cloud and can observe e.g. a gap in the combined point clouds and how that is filled immediately during his movement. Hence, the user is enabled to check the progress of a measuring task in real-time.

According to an embodiment of the invention, the pose of at least one of the images is determined based on resection by use of the position information of the reference points provided by the scanning point cloud, in particular wherein a scaling regarding the surveying coordinate system is provided.

Now referring to the structural embodiment according to the invention concerning the mobile image capturing unit and the surveying instrument, the surveying instrument and the image capturing unit are structurally separated from each other, wherein the image capturing unit is embodied as a mobile digital camera or embodied as or provided by a mobile phone and/or the surveying instrument comprises a camera for capturing the reference image.

Some embodiments of the invention also relates to a system for providing a 3D-point cloud, in particular of an object to be measured, the system comprising a geodetic surveying instrument, in particular laser scanner or total station, with a support structure being mounted on a base of the surveying instrument such that the support structure is pivotable about a first axis defined by the base. Additionally, the geodetic surveying instrument comprises a source of electromagnetic radiation for generating a measuring beam and a directing unit for directing the measuring beam, the directing unit being arranged at the support structure as to provide pivotability of the directing unit about a second axis defined by the support structure, the second axis being basically perpendicular to the first axis.

Furthermore, the geodetic surveying instrument comprises a scanning functionality for providing directing and guiding of the measuring beam in a predefined manner and measuring distances correspondingly, wherein a surrounding according to a defined scanning region is measurable (e.g. with at least partly covering the object) and wherein a scanning point cloud is producible based thereon with reference to a surveying coordinate system which is defined by the surveying instrument. An image generation functionality for generating a first image is provided, wherein a region at least basically corresponding to the scanning region is coverable and wherein the first image represents a reference image the pose of which is known with reference to the surveying coordinate system due to the position and orientation of the surveying instrument for acquiring data the first image is generated from.

In particular, the surveying instrument comprises a camera for capturing the first image, thus, the camera providing respective data of the first image. Alternatively or additionally, the first image can be derived on basis of intensity measures provided by scanning data of the scanning point cloud, which e.g. results in a monochrome image having bright and dark regions according to strong or weak intensity of backscattered measuring light.

The system also comprises an image capturing unit (e.g. a controller of the surveying system) for capturing a first series of at least two images with respective poses, the first series of at least two images being capturable so that that scanning region is partly covered by the at least two images, the image capturing unit being structurally separated from the laser scanner.

Moreover, the system comprises a controlling and processing unit for receiving and processing data from the surveying instrument and the image capturing unit.

According to some embodiments of the invention, the controlling and processing unit provides a structure-from-motion- (SfM) or a SLAM-algorithm which is at least defined by providing execution of the steps of:
    identifying a first set of image points based on the reference image and the first series of at least two images, the image points representing a first set of reference points of a reference point field, wherein each point of the first set of reference point appears in the reference image and in at least one of the images of the first series of at least two images and wherein position information regarding the first set of reference points is provided by the scanning point cloud, and
    determining the poses for the images of the first series of images with reference to the surveying coordinate system, in particular based on resection, using the first set of reference points and the position information (given by the scanning point cloud), the poses representing positions and orientations of the image capturing unit relative to the surveying instrument at capturing the images of the first series of at least two images.

According to some embodiments of the invention, the controlling and processing unit is integrated in the surveying instrument or in the image capturing unit.

According to other embodiments, the controlling and processing unit is provided by an external unit and data is transmitted to and from that unit (e.g. wirelessly) or the controlling and processing unit is provided by a server unit connected to the internet, wherein data communication is performed over internet and data processing is done on side of the server (e.g. cloud computing).

The surveying instrument—according to the invention—may be embodied as a terrestrial laser scanner or a total station, preferably having a camera.

Particularly, the surveying instrument built as a respective laser scanner comprises a reflecting rotation element (e.g. a mirror or prism) arranged at the support structure as to provide rotation of the rotation element about the second axis defined by the support structure and an optical system for directing the measuring beam onto the reflecting rotation element.

According to some embodiments of the invention, the processing and controlling unit is configured so that a method according to any one of those methods described above is performed when running the respective configuration.

Some embodiments of the invention relate to a computer program product having computer-executable instructions implemented for performing a Structure-from-Motion- (SfM) or a SLAM-algorithm according to a method as described above based on receiving a scanning point cloud,
receiving a reference image and
receiving at least two images of the first series of at least two images, in particular when run on a controlling and processing unit of a system according to above description.

Information regarding the scanning point cloud, the reference image and at least a further image (and/or more images of the first series of images) is provided for successively performing a respective algorithm of the computer program product.

BRIEF DESCRIPTION OF THE FIGURES

The method and the system according to the invention are described or explained in more detail below, purely by way of example, with reference to working examples shown schematically in the drawings. Specifically.

DETAILED DESCRIPTION

Figure 1A:
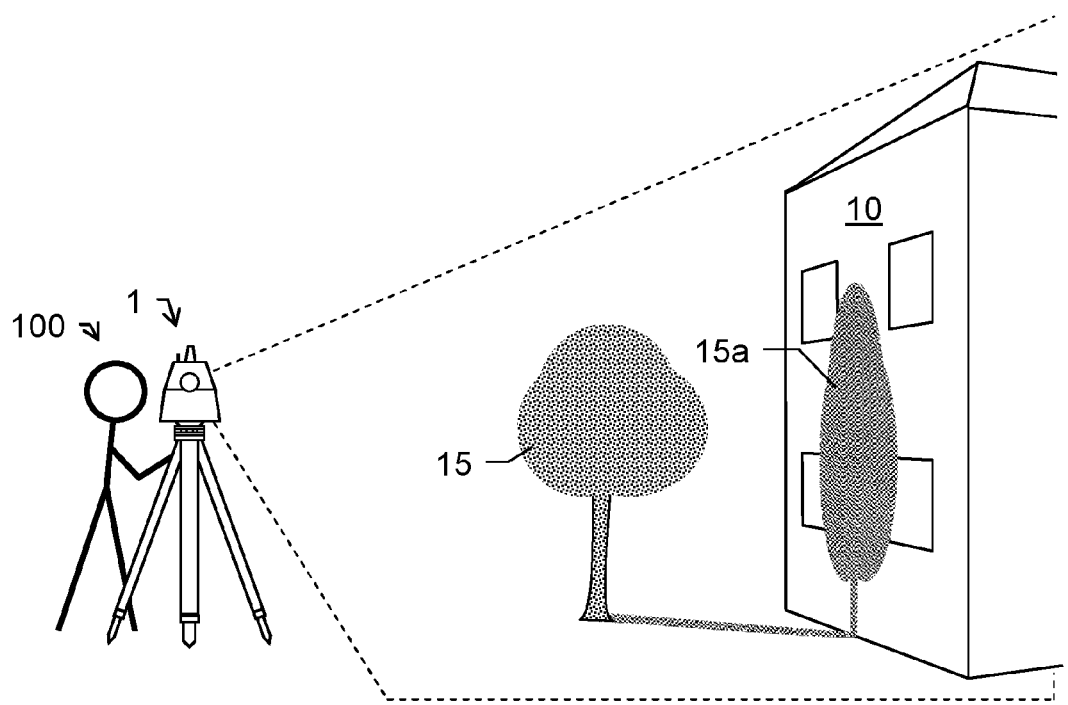
FIG. 1a-b show an operator using a laser scanner and a mobile image capturing unit for deriving a point cloud according to the invention.

FIG. 1a shows an operator 100 using a terrestrial laser scanner 1 according to the invention for measuring an object 10. With such measurement a point cloud is generated representing the surface of the object 10 and covering these parts of the object 10 which according to the relative position of the laser scanner 1 and respective lines of sight from the scanner 1 to the object 10 can be measured, i.e. are visible. The terrestrial scanning instrument 1 enables the acquisition of millions of points in short time with very high accuracy.

As can be seen in FIG. 1a an obstacle 15 (here: a tree) is located between the laser scanner 1 and the object 10 to be measured. Thus, a line of sight to the object 10 is not given with respect to the entire front surface of the object 10. The tree 15 produces a scanning shadow 15a with respect to a scanning measurement and to an image to be captured of the object 10. With other words, a point cloud of the object 10 generated with the laser scanner 1 comprises an area with points not relating to the object 10 or an area with no points (depending on measuring conditions). Such a gap of object data also emerges with capturing an image of the object with a camera on side of the laser scanner 1.

Furthermore, an initial coordinate system is defined by the laser scanner 1, i.e. the point cloud and images captured with the scanner 1 automatically are referenced in that initial system.

According to one aspect of the invention the point cloud generated by the laser scanner 1 is extended during the measuring process by generating further 3D position information for further measuring points related to the object 10. Such further position data is gathered by additional use (additional to the laser scanner 1) of a separated and mobile image capturing unit 20 (e.g. mobile digital camera or mobile (smart-) phone).

Figure 1B:
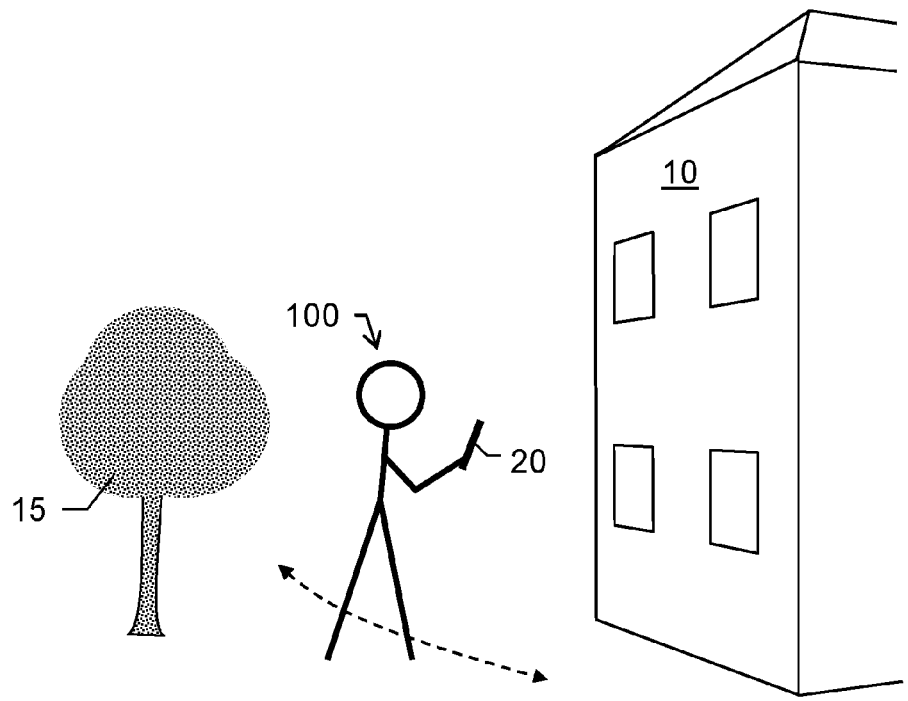

FIG. 1b shows the operator 100 holding such image capturing unit 20 and capturing at least one image of a part of the object 10 after having performed scanning and capturing e.g. a panorama image covering parts of the object 10. The data produced with the laser scanner 1 provide a basis (reference) for further 3D-data acquisition.

Based on the measured scanner point cloud the operator 100 is enabled to determine one or more regions relating to the object 10 which may not be covered by the point cloud as demanded. As a consequence the operator 100 uses the mobile image capturing unit 20 for capturing images which image at least one identified region of interest and additionally comprises a part of the area (object 10) which already is covered by an image taken with the laser scanner 1 or by an image derived from measured intensity values in course of acquiring the scanner point cloud.

According to the invention a SfM- (Structure from Motion) or SLAM- (Simultaneous Localisation and Mapping) algorithm is performed while performing the measurement with the laser scanner 1 and the image capturing unit 20, wherein both image data (captured or processed image) from the laser scanner 1 and from the image capturing unit 20 (particularly relating to a series of images) are mutually processed. On execution of the algorithm the image taken with the scanner and the at least one image, preferably at least two images, taken with the capturing unit 20 are processed so that a set of image points is identified based on that images, wherein the image points represent reference points of a reference point field and each reference point appears in both images. Thus, homologous points are identified. Moreover, a pose for the at least one image captured with the image capturing unit 20 is determined regarding the scanner coordinate system based on resection using the reference points, the pose representing a position and orientation of the image capturing unit 20 for the captured image relative to the laser scanner 1.

Positions of the reference point are known from the measurement of the laser scanner 1, i.e. the positions are given by the scanning point cloud.

In a next step, particularly, new 3D points are derived by applying forward intersection on basis of the series of images (here: at least two images captured with the image capturing unit 20, the poses of which have been derived beforehand) and the reference image, the new 3D points relating to areas on the object 10 which are not visible with the laser scanner 1. Such additional position information may be added to the scanning point cloud in order to generate a point cloud comprising more and/or more precise information regarding the topography of the object 10.

By such combination of the measuring functionality of the laser scanner 1 with the image capturing functionality of the mobile image capturing unit 20 the image capturing unit 20 can be used to fill gaps or hidden areas in a laser-based point cloud (=point cloud generated with the laser scanner 1) or enables to simply extend the laser-based point cloud. As a result a new point cloud which includes laser-based and image-based 3D-point is created. All such 3D-points are originally automatically (due to the common processing of images) registered into the same (scanner) coordinate frame.

Depending on the used registration method the image-based point cloud needs not to have overlapping regions with the laser-based point cloud as long as there is an overlap in the corresponding image data.

The above workflow according to the invention could be applied both for indoor and outdoor environments.

The invention might be used in practice for generation of point clouds for areas which are not visible from the surveying instrument but might be surveyed using a camera unit and applying a SfM- or SLAM-algorithm, particularly in combination with a dense-matching algorithm, e.g. SGM, according to the invention.

Figure 3A:
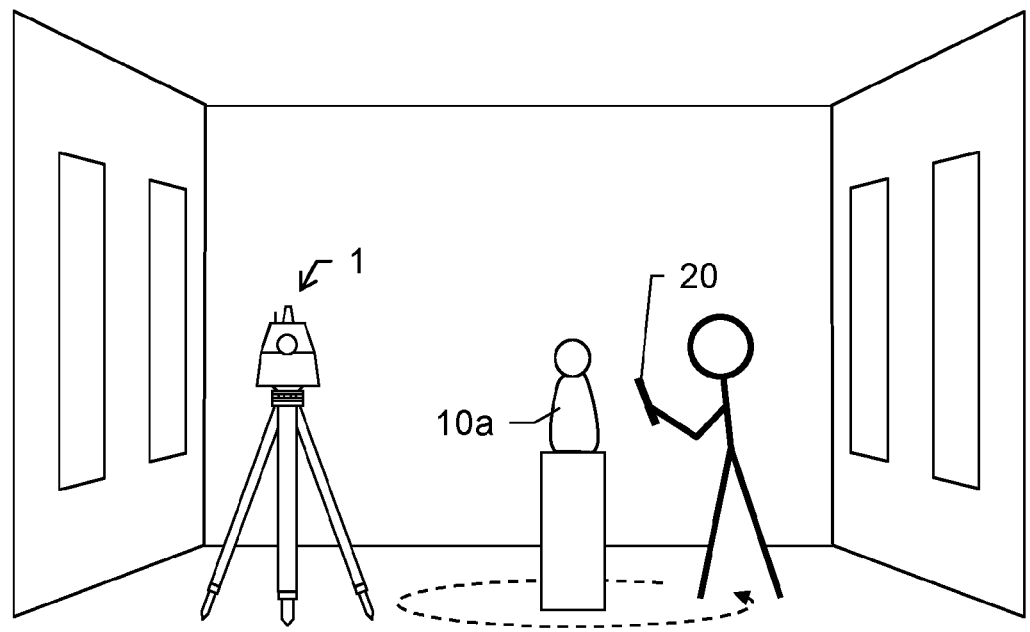
FIG. 3a-b illustrate generating a point cloud of an object of interest according to an embodiment of the invention by use of a laser scanner and a mobile camera unit.
Figure 3B:
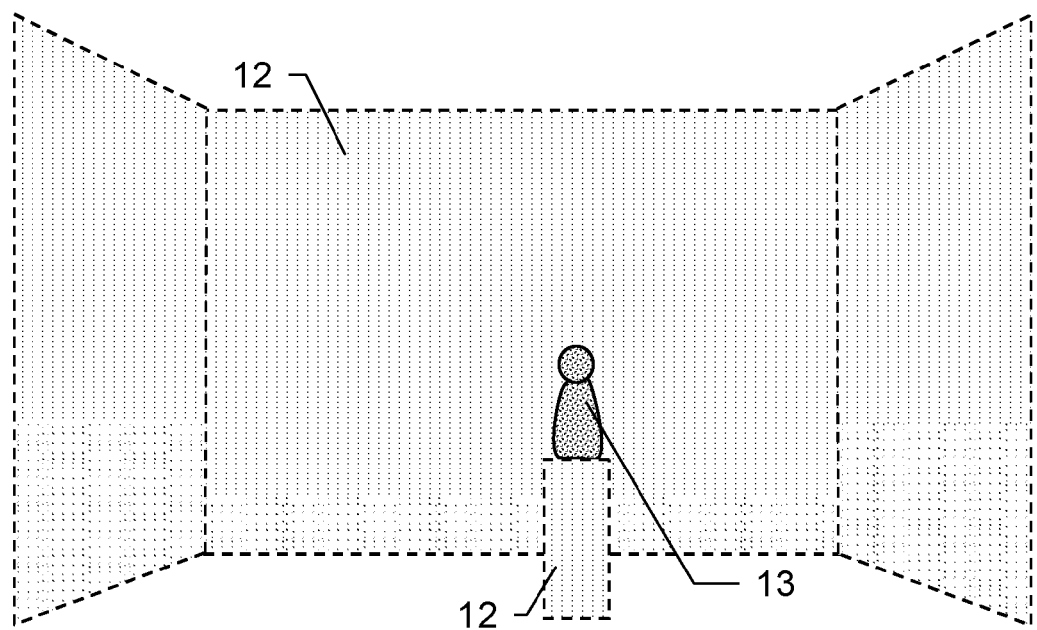

Alternatively, the invention might be used for detailed high resolution scanning, e.g. a small object of interest is reconstructed from image data acquired with the camera module in high-resolution moving the camera module close to the object of interest. E.g. the entire room, i.e. the environment, is scanned with the surveying instrument in low resolution, and some objects are reconstructed using images with high resolution (comp. FIGS. 3a and 3b).

Figure 4:
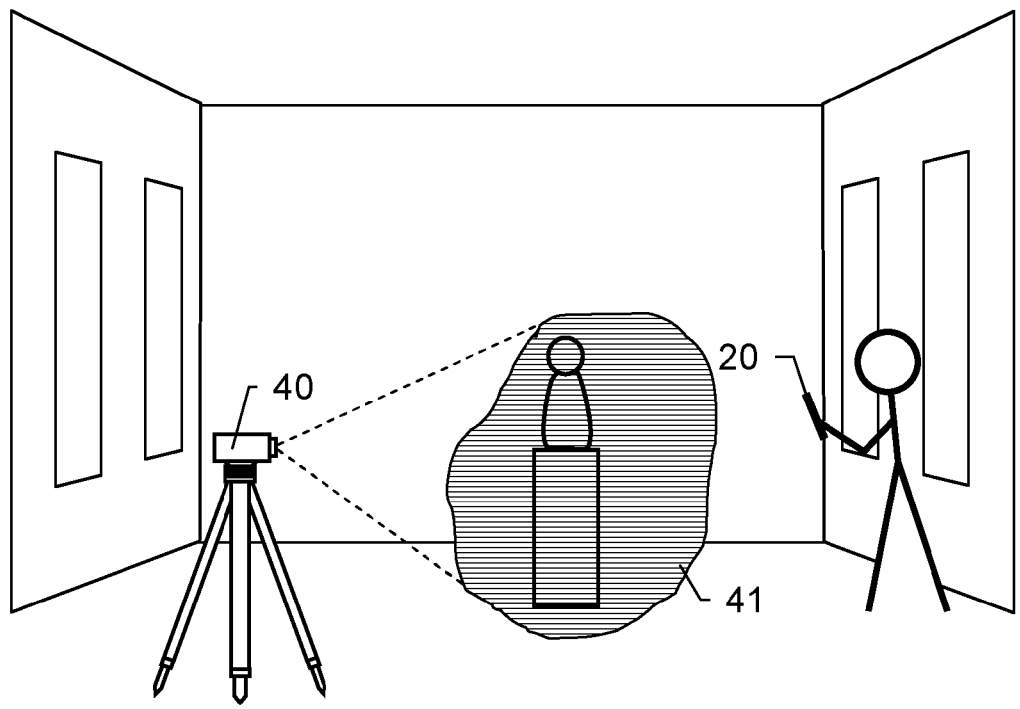
FIG. 4 shows pattern projecting for more precisely generating a point cloud according to the invention.

In case of a lack of texture on the object a static projector could be used for projecting an additional texture pattern on the object surface (see FIG. 4). This helps to get better results of image-based 3D reconstruction, in particular in the reconstruction of homogenous or untextured surfaces.

Figure 2:
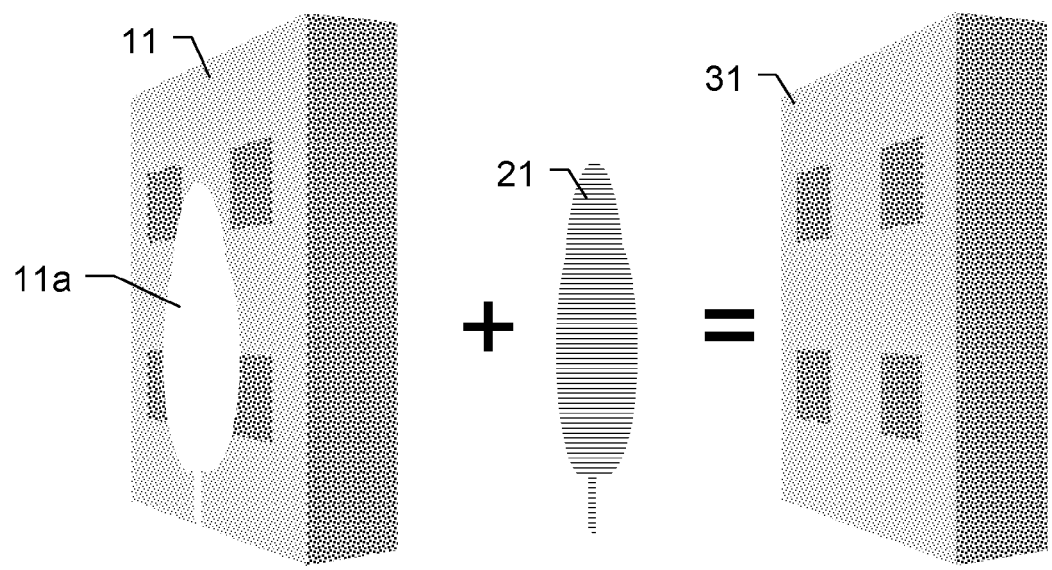
FIG. 2 illustrates a scanning point cloud and an image-based point cloud and the resulting point cloud of processing data from a scanner and a camera together according to the invention.

FIG. 2 shows a first point cloud 11 which corresponds to a result of scanning the object 10 with a laser scanner setup of FIG. 1a and a second point cloud 21 which results from image data (particularly provided by a series of images) gathered with an image capturing unit 20 according to FIG. 1b and processing of that data (together with an image from the scanner) according to the invention. The second point cloud 21 covers at least an area 11a of the object, which was not or not correctly covered by the first point cloud 11. By processing image data with a SfM- or a SLAM-algorithm and additionally applying a dense matching algorithm (which enables forward intersection using at least two images) according to the invention a new point cloud 31 is derived which comprises both data from the first 11 and from the second point cloud 21 and thus, provides complete topographic information to all parts of interest of the object.

FIGS. 3a and 3b show a measurement of an object 10a according to an embodiment of the invention, wherein the measurement is performed indoors with use of a laser scanner 1 and a mobile camera unit 20. A scanner point cloud 12 of the room and of a part of the object 10a (the part referring to the field of view of the scanner 1 in relation to the object 10a, i.e. the part being visible from the pose of the scanner) and a corresponding image at least covering a part of the walls of the room and/or of the object 10a are generated. In a later step, the operator takes a series of images while moving around the object 10a, basically each image covering a part of the object 10a. The algorithm according to the invention is executed while capturing the series of images, wherein at least one of the images of the series is processed together with the scanner image in order to identify points in the images which relate to identical points in the captured surroundings. I.e. a respective identical point in both images may lie on the object 10*a* or on a wall of the room.

Based on the determined identical points, a poses for the respective camera images are calculated using resection, wherein for calculation of such poses not necessarily points lying on the object 10*a* have to be considered but positions of respective (reference) points have to be known, e.g. from the scanning point cloud or from previously performed forward intersection for generating additional (to the scanning point cloud) 3D-position information. In a next step, based on the calculated poses of the respective camera images (and the known pose of the reference image of the laser scanner 1), information regarding a 3D-position of a point of at least a part of the object 10*a* (covered by the camera image but not covered by the scanner point cloud) is derived by forward intersection using the camera images. The scanning point cloud is actualised by adding the derived position information to the scanning point cloud and thus extending the point cloud data.

Such processing is performed for each image of the series of images taken by the mobile camera 20, in particular wherein a point cloud 13 representing the object 20 is derived on basis of camera image data. For processing of successive images image information of the scanner not necessarily has to be still considered.

Using pose information of two images captured by the image capturing unit further reference point may be derived, those further reference points being part of an imaging region which is different to the scanning region. Position information of these reference point may be known from forward intersection using the at least two images.

Alternatively, the scanner point cloud is densified by adding further 3D-points which are derived at least by using one camera image or the scanner point cloud may be replaced with respect to the points relating to the object 10*a*, thus to provide information of the object with higher accuracy, which could be reached by processing the captured images respectively (depending on the measurement conditions, e.g. distance between laser scanner 1 and the object 10*a* and depending point-to-point resolution of the scanner point cloud at the object).

FIG. 4 shows a further embodiment of the invention, with projecting a pattern 41 at least onto the object to be measured with a pattern projector 40. The image capturing unit 20 is used for capturing images of the object, wherein the pattern provides for gathering images with improved texture information. According to the invention, in advance to the pattern projection and the capturing of images with the image capturing unit 20 the object is scanned with a surveying instrument, e.g. with a total station or multi station, and the point cloud emerging from that scanning represents the basis for scaling of data processed by use of the captured images. Moreover, a respective image taken with the surveying instrument forms a reference image for being processed with one or more of the captured images.

Figure 5A:
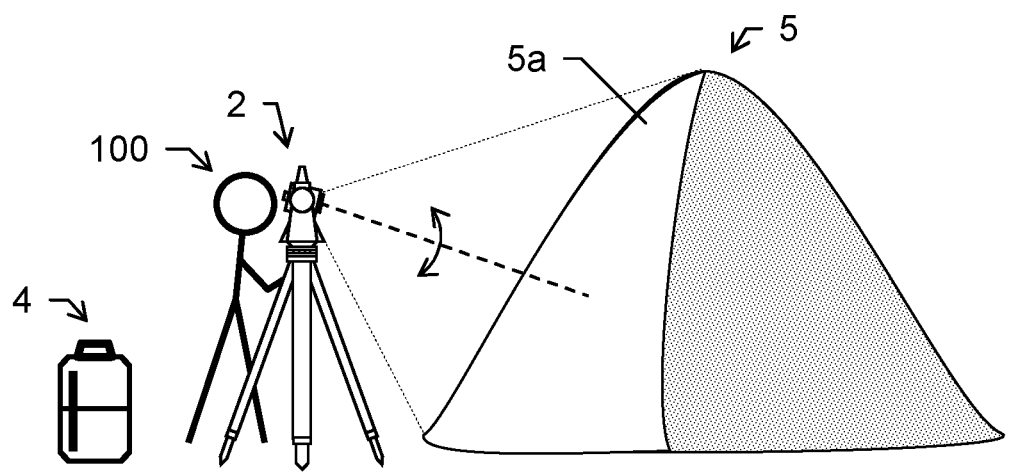
FIG. 5a-b illustrate a first workflow according to an embodiment of the invention enabling to provide an extended point cloud of an object.
Figure 5B:
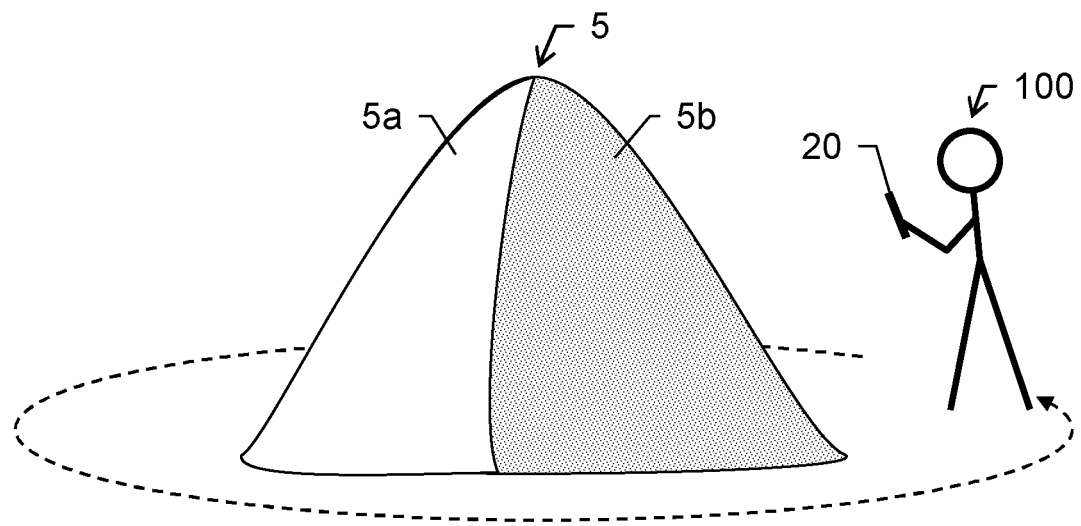

FIGS. 5*a* and 5*b* illustrate a first workflow according to an embodiment of the invention as follows:

1. The user 100 performs a scan with a surveying instrument 2 (here: total station 2, e.g. Leica Multi Station 50). The resulting point cloud is shown on the display of the total station 2 and enables the user 100 to identify the size and dimension of the point cloud regarding an object 5 to be measured and/or the locations of gaps in the point cloud. The point cloud at least represents a first part 5*a* of the surface of the object 5 which is visible from the surveying position.

2. An overview image of the object 5 is generated, e.g. a single image taken with the overview camera of the total station 2 or a set of images which are combined to an image mosaic. The image and the point cloud are transmitted to a processing unit 4. The processing unit 4 here is provided by a mobile external unit (e.g. integrated into the carry case of the surveying instrument) with communications means for receiving and sending data. Alternatively, (here not shown) the processing unit may be provided by the surveying instrument 2 or the mobile camera module 4.

3. The user 100 acquires image data (corresponding to a first set of images) by moving the camera module 20 (e.g. a smart-phone) around the object 5 (FIG. 5*b*) according to the regions of the object's surface additionally to be covered (e.g. considering gaps in the point cloud). The image data should at least partly cover that region of the object 5 not covered yet 5*b* (i.e. regions which are not visible by the surveying instrument 2) but also the neighbouring areas (i.e. some parts of the area which is covered with the surveying instrument as well) or areas in the background of the object 5. The acquired data is transmitted to the processing unit 4.

4. From the image data and the point cloud acquired with the surveying instrument 2 (and the image data captured with the mobile camera unit 20) a point cloud is generated. The poses of the images, i.e. the images of the camera unit 20 and the image from the surveying instrument 2 are determined based on a structure-from-motion or SLAM algorithm (starting from the image captured with the surveying instrument 2 and thus providing reference to the surveying coordinate system).

5. 3D-coordinates for point features detected in the image of the surveying instrument 2 are derived from the point cloud generated with the surveying instrument 2 (laser-based point cloud). For the detection of point features (image points representing reference points of a reference point field) in the set of images, feature matching algorithms can be applied, e.g. SIFT, SURF, etc. Deriving the corresponding 3d-information from the scanning data and introducing these points as "ground control points" in the structure-from-motion or SLAM algorithm, the poses of the images from the mobile camera unit 4 are determined in the coordinate system defined by the surveying instrument 2 (see FIG. 7).

6. Moreover, optionally also a dense matching algorithm can be applied which results in a dense point cloud given in coordinates system of the surveying instrument 2.

Figure 6:
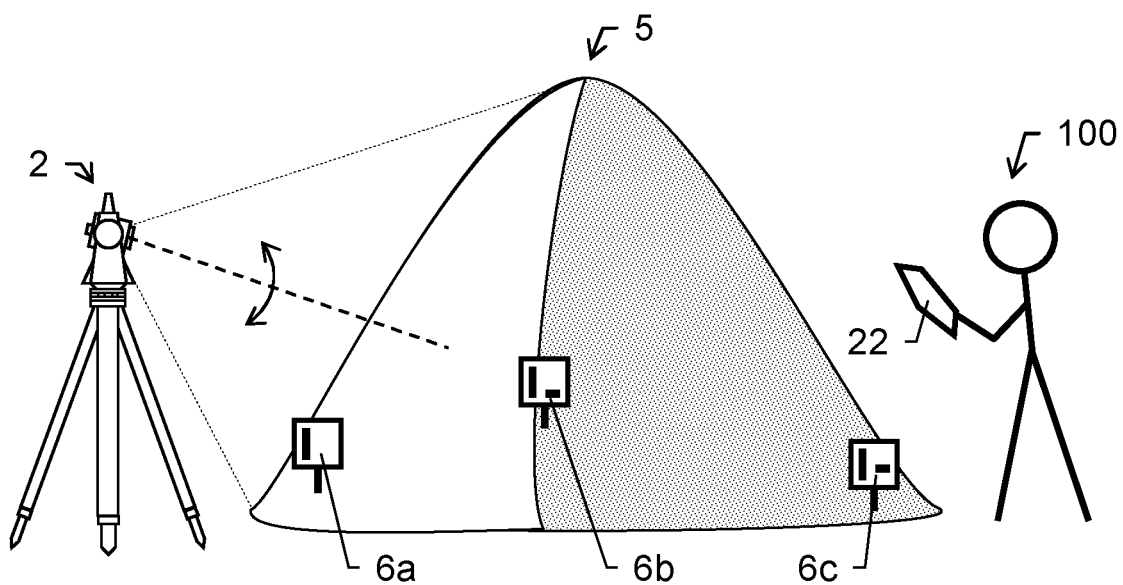
FIG. 6 illustrates an alternative workflow according to an embodiment of the invention enabling to provide an point cloud of an object using markers.

FIG. 6 illustrates an alternative workflow according to another embodiment of the invention as follows:

1. The user places three or more markers 6*a-c* around the object 5. The markers 6*a-c* can be coded with a unique ID which enables the assignment of an individual ID to each marker 6*a-c*.

2. The positions of the markers 6*a-c* are measured with the surveying instrument 2 (e.g. total station or laser scanner)—either by a reflector-less measurement onto the marker or with a surveying pole or by scanning. Such scanning can be carried out manually by the user or can be part of an automated process (automatic search of markers).

3. The user performs a scan of the object 5 with the surveying instrument 2. The resulting point cloud is shown on a display and enables the user to determine the size and dimension of the point cloud regarding the object 5 to be measured and/or the locations of gaps in the point cloud. The point cloud at least represents that first part 5*a* of the surface of the object 5 which is visible from the surveying position. Controlling of the surveying instrument 2 is performed on side of controlling unit 22 which also provides a mobile camera unit and particularly a processing unit.

4. The user acquires image data by moving the camera unit, i.e. the controlling unit 22 with the respective camera, around the object 5 according to the regions of the object's surface additionally to be covered (e.g. considering gaps in the point cloud). The image data should at least partly cover that region of the object 5 not covered yet 5*b* (i.e. regions which are not visible by the surveying instrument 2, like gaps in the point cloud) but also the neighbouring areas or areas in the background of the object. Moreover, the images should contain at least three or more markers 6*a-c*. The acquired data is transmitted to the processing unit.

5. The markers 6*a-c* are detected in the images from the camera unit—either automatically by means of image processing or manually by the user 100.

6. From the image data and the point cloud acquired with the surveying instrument 2 and the image data captured with the controlling unit 22 a point cloud is generated. The poses of the images, i.e. the images of the controlling unit 22 and the image from the surveying instrument 2 are determined based on a structure-from-motion or SLAM algorithm. The positions of the markers 6*a-c* can be introduced as "ground control points" (reference points of a reference point field).

7. Moreover, optionally also a dense matching algorithm can be applied which results in a dense point cloud given in coordinates system of the surveying instrument 2.

Figure 7:
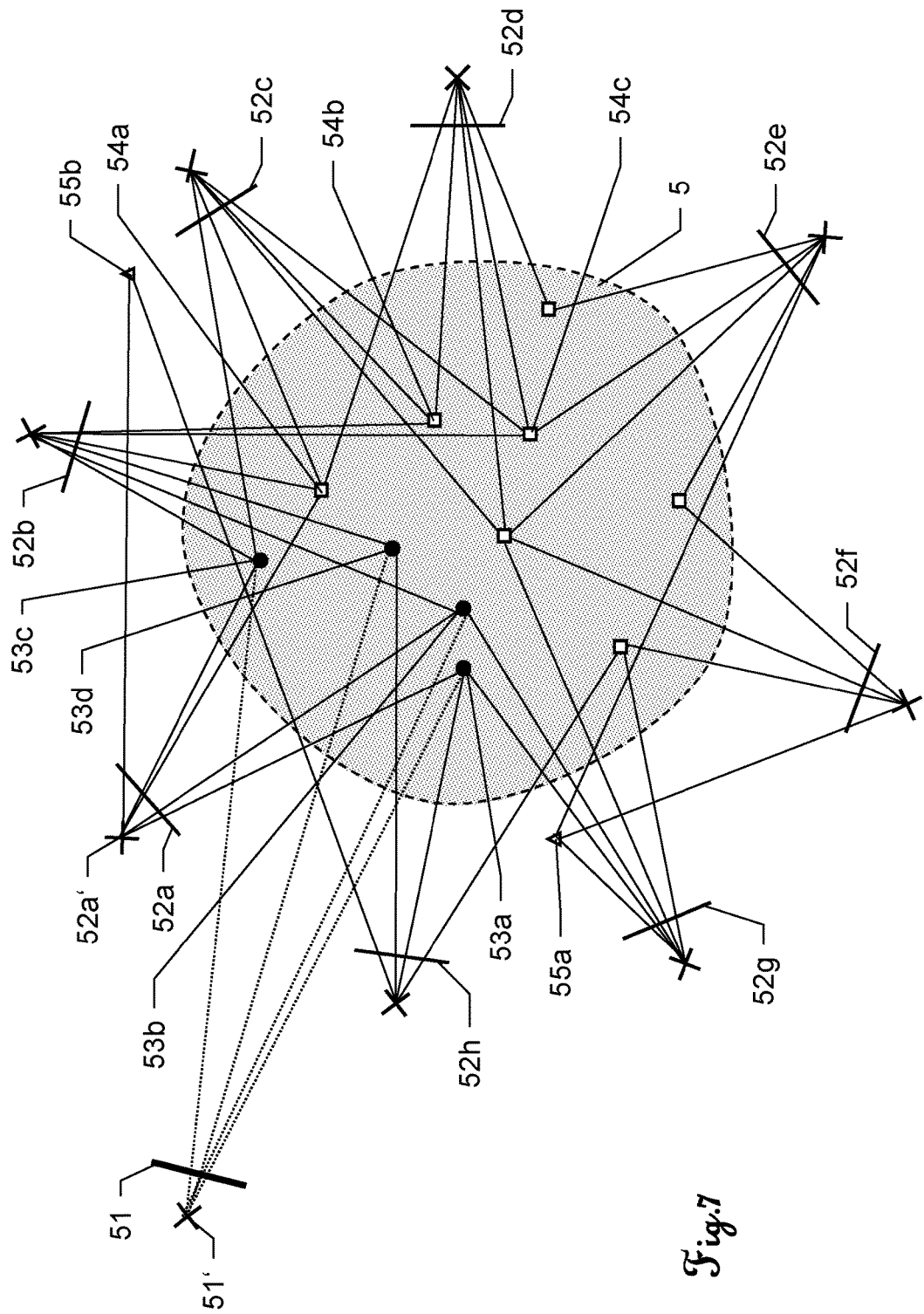
FIG. 7 shows the principle of generation of a point cloud according to the invention.

FIG. 7 shows the principle of generation of a point cloud according to the invention with starting of capturing an image 51 of the object 5 (e.g. of a stock pile similar to one of the FIGS. 5*a*-6) on side of a surveying instrument.

Next the images 52*a* and 52*b* as the first two images of a first series of images are captured with a mobile image capturing device, e.g. a digital camera, a controller for the surveying instrument or a smart-phone. The images 52*a* and 52*b* cover a part of the object 5, which also appears in the image 51 taken with the surveying instrument. Due to executing a SLAM- of SfM-algorithm a first set of image points is recognized in the three images 51, 52*a* and 52*b*, which represent reference points 53*b-d* of the reference point field. As additional position information for such points is already available by the surveying instrument, these first reference points are also known as so called "ground control points".

The surveying instrument defines a coordinate system according to its position and its orientation for capturing the image 51 (=known pose for the surveying image 51).

Using the identified reference points and geometrical principles of resection a pose for the images 52*a* and 52*b* is calculated. That pose is calculated so that its position and orientation is known in relation to the defined surveying coordinate system. In particular, for such calculation a projection centre 52*a*' is determined for each image 52*a* captured with the image capturing device. For the image of the surveying instrument the pose 51' is already known.

The pose calculation may be based on the three common reference points 53*b-d* or may be done for image 52*a* by use of points 53*a-c* and for image 52*b* by use of points 53*b-d*. Position information for all these points 53*a-d* is provided by the surveying instrument. All reference points used up to that stage lie on the object 5.

After having determined the poses of images 52*a-b*, forward intersection is performed by use of those images 52*a-b* in order to derive further position information for points on the object 5. By that, e.g. a 3D-position of point 54*a* can be determined. This point 54*a* may be used as an additional reference point.

The process may then be continued by capturing next images 52*c-h* of a second series of images and calculating their poses by use of additionally image-based derived reference points (not shown), wherein further position information for additional new points are derived e.g. of points on the object and/or points (55*a-b*) in the background (in the surrounding). For instance, coordinates for point 55*a* can be determined by forward intersection using images 52*e* and 52*f*, wherein that point 55*a* then may be used as further reference point for calculation of the pose of image 52*g*.

Calculating the pose for an image may not only be based on using one single more image with already known pose, but may be performed with using a combination of captured images (and their poses).

An overall compensation of position data calculated during the capturing of some of the images which do not cover those parts of the object 5 which are already covered by the scanning point cloud (and the respective image), is performed at least when a newly captured images (again) covers a region of the object, which is already covered by the laser scanner ("closing the circle of images").

From images 52*a-c* (which cover at least one ground control point 53*b-d*) position data of new reference points 54*a-c* is computed by forward-intersection. That process may introduce some errors. The pose of the next image 52*d* is computed by resection based on those calculated (image-based) reference points 54*a-c* which consequently includes some error as well. In conclusion, some additional error is introduced in the derived poses of subsequently calculated poses. For the forward-intersection of new reference points the errors of the poses are forward-propagated as well.

Reaching the end of the loop ("closing the circle of images"), for calculating the poses of images 52*g* and 52*h*, ground control points 52*a,b,d* (=reference points) are used once more. As those points were measured with the surveying instrument, those points provide most exact position information (without processing errors). Thus, the use of those points 52*a,b,d* with the SLAM- or SfM-algorithm provides for reduction and/or compensation of propagated position errors.

A new or additional point cloud based on not only data from the surveying instrument but also on image data provided by the image capturing unit (images 52*a-h*), particularly is continuously calculated or extended using forward intersection of image data provided by respective images. Thus, a point cloud of the entire object 5 is generated iteratively, by continuously adding image data to the SLAM- or SfM-algorithm and respective consideration of such data for processing. Particularly, the series on images 52*a-h* (in addition to the image 51 of the surveying instrument) covers all regions of the object 5 of interest.

Applying bundle adjustment on the gathered data, particularly continuously as well, provides for highly accurate position data for the reference points but also for the 3D positions of the generated point cloud(s). Thus, compensation of calculated position data is provided. Moreover, according to a final bundle adjustment the reference points gathered by the surveying instrument are introduced as "ground control points". Such ground control points build a base for bundle adjustment and are considered as being correct (without significant error) with respect to their positions and thus their positions are not adapted. Alternatively, some small positional error of the ground control points is considered, e.g. a possible error of 5 mm. This uncertainty can be introduced as a weighting in the bundle adjustment which may lead to a small adaptation of the positions of these points. Moreover, respective weighting related to errors of imaged-bases points can be introduced as well, e.g. a possible error of half pixel, wherein a positional adaptation of those points within that limits is accepted. The positions of so called "tie points" (=reference points the positions of which are determined on bases of forward intersection with images (e.g. points 54a-c)) are corrected by help of such a bundle adjustment.

Now referring to the aspect of registration of data gathered with the mobile image capturing unit relative to data generated with the surveying instrument (e.g. laser scanner or total station), for the registration seven parameters (three translations, three rotations and one scale) which define the relative pose of the image-based point cloud (generated with data from the captured series of images) with respect to the laser-based point cloud (generated with the surveying instrument) would have to be determined. This can be carried out explicitly or implicitly (according to one of above workflows according to the invention) where reference data from the surveying instrument is already introduced in the structure-from-motion or SLAM algorithm.

The coordinate frame related to the surveying instrument is considered as the reference frame. Input for the registration could be one or more laser-based point cloud, image data from the image capturing unit, image data or marker measurements from the surveying instrument or the like.

In the approach according to the invention the point cloud is generated directly in the coordinate system of the surveying instrument from the beginning. An additional registration step of image-based position data thus is unnecessary. Additionally, as position data is available for the scanner point cloud and as that information is processed within the SfM- or SLAM-algorithm, resulting poses of point coordinates are of correct positions and/or scale already.

Regarding the identification of reference points, an (automatic) identification of such reference points e.g. "ground control points" or "tie points" which are then used in the SfM- or SLAM algorithm as explained above may be performed as follows:

Marker-Based Identification:

A user places three or more markers in the surrounding e.g. around the object. The positions of the markers are measured with the surveying instrument—either by a reflector-less measurement onto the marker or with a surveying pole or by scanning. Alternatively, these markers could be observed by the instrument camera, automatically detected by the camera and automatically measured by the laser scanner. This approach increases an automation level.

These markers are scanned using a laser scanner or total station and also each marker should be visible at least on one image or video frame from the mobile camera unit. Such coded markers are detected automatically (preferred), alternatively manually, in laser-based point cloud or panorama image and in the images from the mobile camera unit. Thus, corresponding markers are identified in both images. Based on the coordinates of the image points in the reference image and the scanning data the 3d-coordinates are derived. These 3d-coordinates are introduced as reference points (ground control points) for the corresponding image points in the mobile camera image and used for resection of its pose.

Image-Based Identification:

The identification task might be solved by finding a set of common points onto images, using feature point detectors and descriptors (e.g. SIFT, SURF etc.). At least three points in at least two images should have corresponding 3D points in the captured surrounding.

Figure 8:
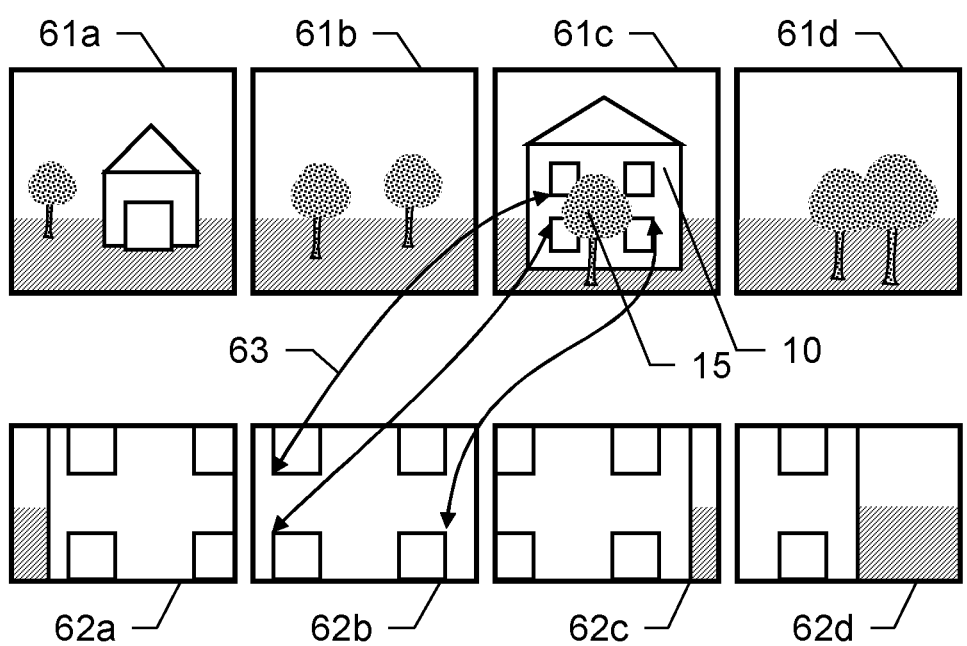
FIG. 8 illustrates image-based registration of image data from different sources.

With reference to FIG. 8, a first set of images 61a-d represents images taken with a surveying instrument, e.g. four images from a cube map, wherein image 61c shows an object 10 corresponding to FIG. 1a together with an obstacle 15 (tree). A second set of images 62a-d corresponds to an image sequence 62a-d from a mobile camera unit, each image at least partly shows the object 15 (without the tree 15 in order to complete a point cloud).

Using the automatic images-based registration approach, homologous points 63, e.g. by feature matching, are identified in image 61c and one or more of the images 62a-d (an example shown here is a feature matching based on image 62b). By that, reference points (ground control and/or tie points) can be determined.

Manual Identification:

Here, three or more common points in at least two images are selected manually, e.g. by displaying the images and enabling the user to pick the corresponding points. Thus, the user may pick corresponding points in images from the camera unit and the surveying instrument. For the selected point in the image the corresponding 3D coordinate is derived from the point cloud. To avoid false picking, the areas which are covered by the point cloud can be displayed as an overlay onto the image.

Figure 9A:
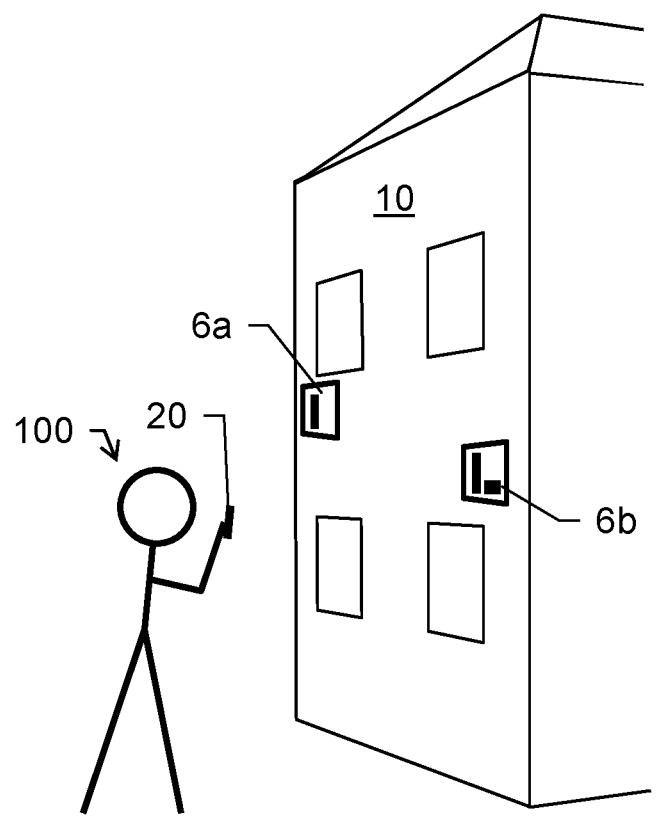
FIG. 9a-b show a further embodiment according to the invention, wherein a completeness check is provided to a user according to the invention.
Figure 9B:
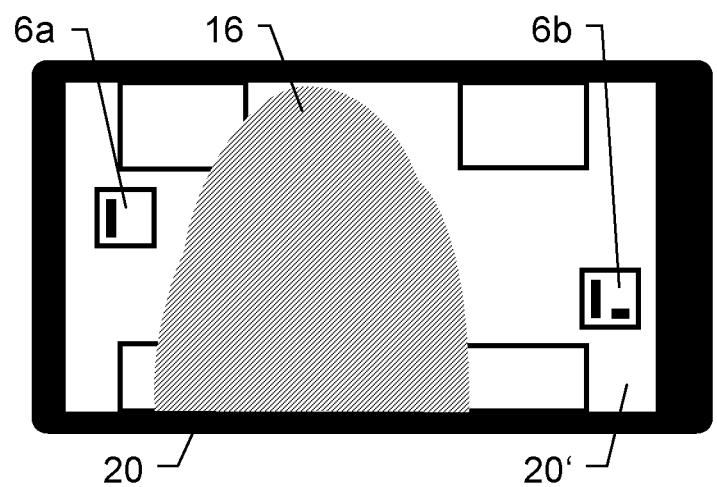

FIGS. 9a and 9b show a further embodiment according to the invention, wherein a kind of completeness check is provided to a user 100. During the image acquisition with a mobile camera unit 20 the pose of the camera unit 20 with respect to the point cloud acquired from the surveying instrument can be determined, e.g. based on feature matching techniques or the detection of markers 6a,6b. This enables the display of the laser-based point cloud or the missing parts as an overlay 16 in the live image on a display 20' of the mobile camera unit 20 (here: smart-phone). This helps the user 100 to identify the missing parts 16 and guides him to fill e.g. respective gaps 16, i.e. capturing images which provide image data for extending or completing the surveying point cloud.

Moreover, as the image-based point cloud particularly is generated in real-time, it can also be displayed on the camera unit for the guidance of the user. Thus, the user is provided with a real-time display of the object 10 and its parts, which are already covered (or not yet covered) by point cloud data.

Figure 10A:
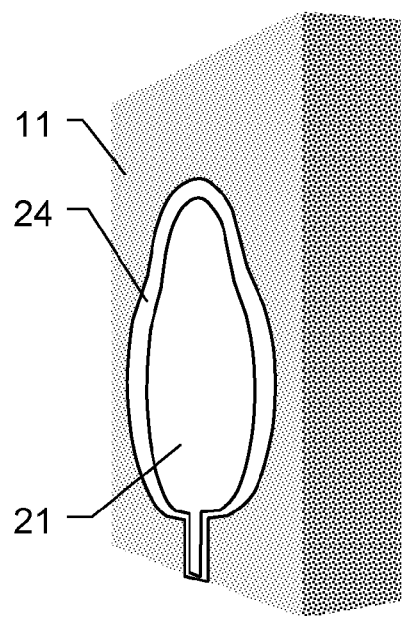
FIG. 10a-b illustrate the fusion of different kind of position data according to the invention.
Figure 10B:
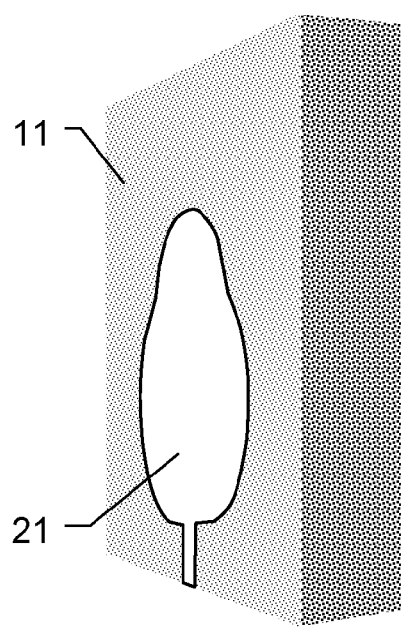

A further aspect according to the invention relates to the fusion of different kind of position data as illustrated in FIGS. 10a and 10b.

The image-based position data 21 and the laser-based position data 11 may have different quality, i.e. the accuracy of the 3D coordinates of the points might be different. According to the present embodiment of the invention, this aspect is considered in the fusion of laser-based and image-based position data. With respect to overlapping areas 24 where point of higher quality, e.g. acquired with the surveying instrument (laser-based), and points of lower quality, e.g. acquired with the camera unit (image-based), are present a filtering based on the point quality is applied. For instance in the overlapping areas 24 the points with lower quality can be erased while the points with higher quality are kept. In FIG. 10b a combined point cloud is shown where with respect to the overlapping area 24 only the points of higher quality (point cloud data corresponding to point cloud 11) from the surveying instrument are present.

Figure 11:
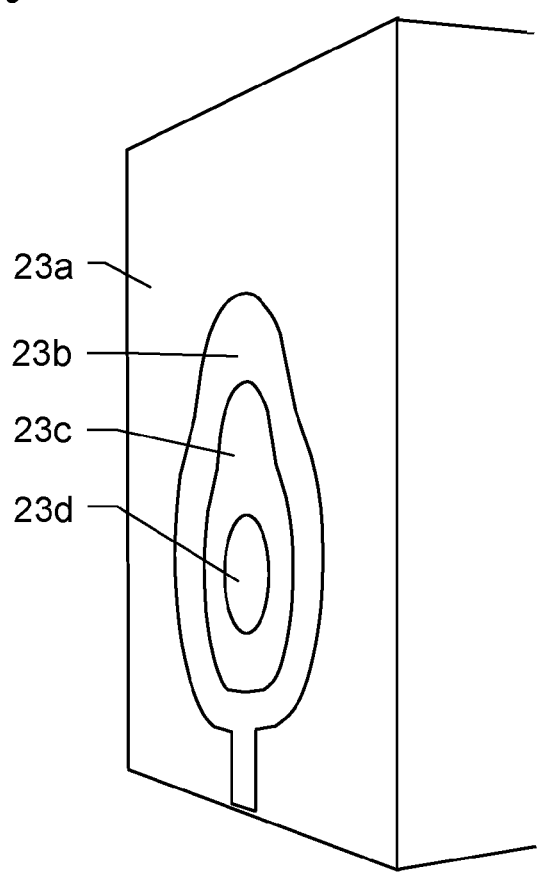
FIG. 11 shows an alternative way of displaying point cloud quality according to the invention.

FIG. 11 shows an alternative way of displaying point cloud quality according to the invention. Here, for different areas 23a-d of the object different point cloud qualities are available. Depending on given measurement conditions, a desired accuracy for the generated point cloud(s) is to be reached. E.g. there is an area where an accuracy of 20 mm is sufficient where in other regions an accuracy of at least 5 mm is needed. A visualization of the quality, e.g. colour-coded, helps the user to decide whether the required quality for a specific area is given or whether some additional operation have to be done to achieve the required accuracy, e.g. additional scans or capturing more images. Here: the point-to-point accuracy of area 23a is 5 mm, of area 23b is 20 mm, of area 23c is 15 mm and of area 23d is 10 mm.

Figure 12:
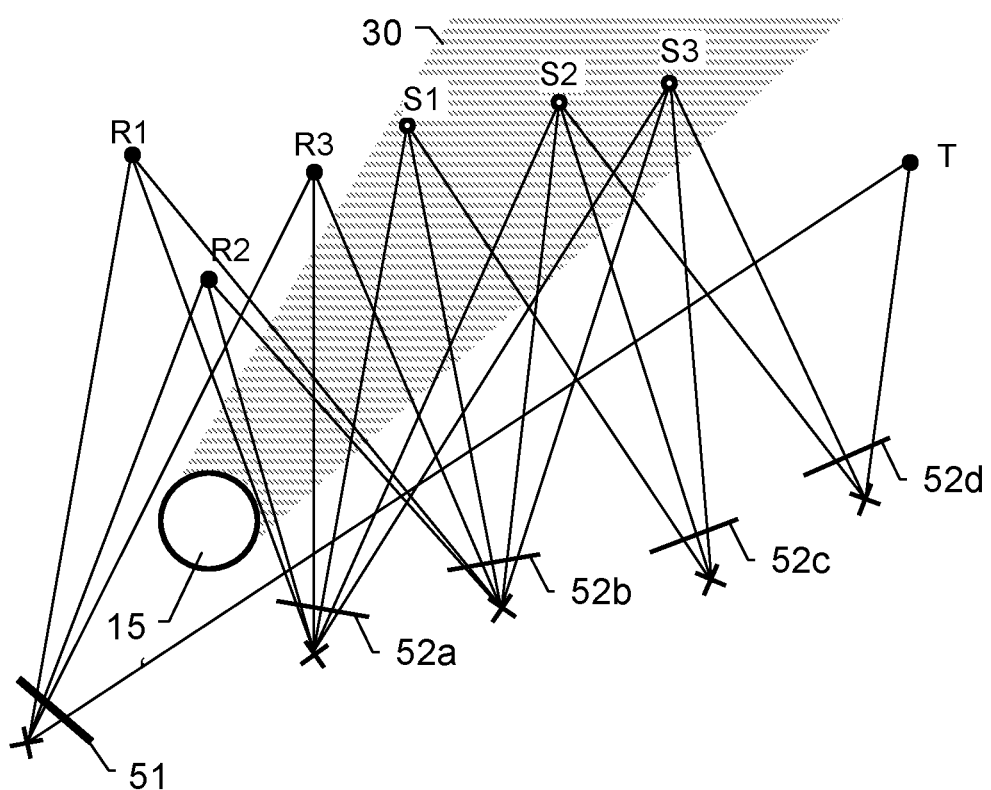
FIG. 12 shows a further embodiment of the present invention and the respective method for generating a point cloud.

FIG. 12 shows a further embodiment of the present invention and the respective method for generating a point cloud.

In that context, homological points R1-R3 in the image from the surveying instrument 51 and the first two images 52a-b (belonging to a first series of images) from the camera, e.g. by feature matching, are identified. Computation of the poses of these images 52a-b by including the 3d-coordinates of points R1-R3, which are derived from measurements with the surveying instrument, is performed.

Then, 3d-coordinates of points S1-S3 are computed by forward-intersection based on images 52a-b. Based thereon, the pose of a third image 52c (belonging to a second series of images) based on points S1-S3 is computed. If a further image 52d (also belonging to a second series of images) would contain any of points R1-R3 or T, also this point would be used for its pose determination. Thus, the pose of image 52d is determined based on points S2, S3 and T.

Finally, a bundle adjustment is computed where the poses of images 52a-d and the 3d-coordinates of points S1-S3 are optimized. Points R1-R3 and T are included as ground-control points in the bundle-adjustment.

Furthermore, a dense-matching may be applied to images which cover at least partly the scanning shadow 30, e.g. images 52a-d, to get a point cloud for this area.

Figure 13:
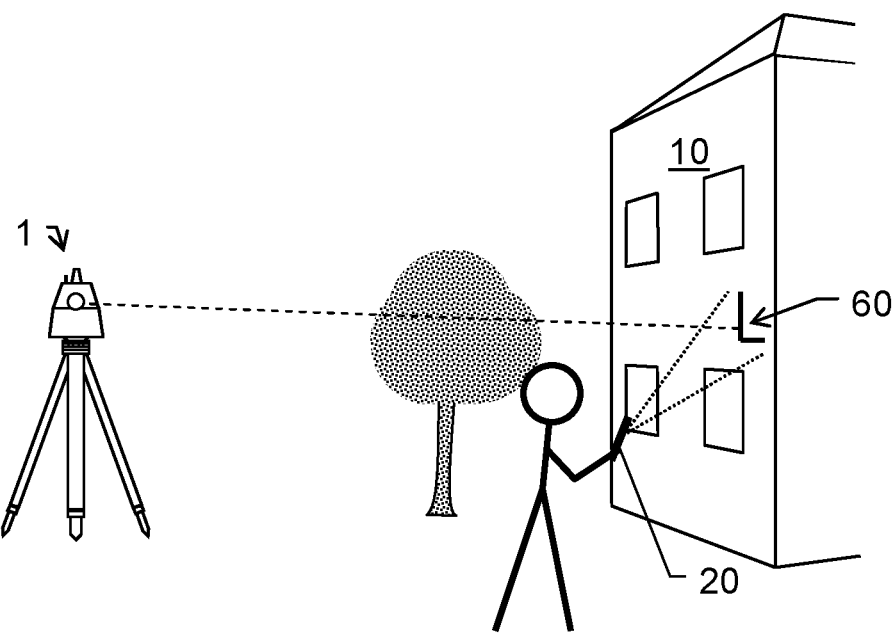
FIG. 13 shows an alternative method to feature matching based on two sets of images.

FIG. 13 shows an alternative method to pure feature matching based on two sets of images, one captured by the laser scanner 1 and the other by a camera 20, can be realised by using the laser scanner 1 itself as a feature generator. To be more precise, it is proposed to use the laser scanner 1 in projection mode, where it generates a specific pattern 60, e.g. a stationary pattern like a checkerboard, by rotating and triggering its targeting laser system synchronously according to that pattern 60. The pattern itself can be arbitrary, e.g. a coded marker, single points, crossing lines as well as its generation. Particularly, the generation is not limited to the procedure mentioned above (rotation and triggering of the laser beam) as it is also possible to project a single measured point complemented with a well known fixed pattern/geometry generated by a stencil (no rotation of the scanner needed).

The proposed strategy is useful in situations where the scene/environment does not offer feature points that are traceable in a stable manner for the camera system 20, e.g. plain homogenous surfaces. The main advantage is that there is no need to search for features in images/point clouds of both systems (scanner 1 and camera 20), but only in the camera images 20, because the projected feature points are already known, particularly labelled, and highly accurate referenced in the scanner coordinate system.

A possible workflow could be as follows: first, the scene is captured by doing a scan with the laser scanner 1. When the task is completed the laser scanner 1 is switched into projection mode and a pattern is projected onto a surface (not necessarily in an already scanned region). Second, the mobile camera 20 is used to perform an additional scan of another region, e.g. disjoint to the first scanned region, such that during the recording the projected pattern 60 of the laser scanner 1 is at least seen once in a camera image. Finally, using an automatic (preferred) or manual detection of all feature points of the pattern 60 the absolute orientation and position of the camera 20 referenced in the scanner coordinate system can be determined. In particular, advanced algorithms can be used for most accurate and reliable feature detection, e.g. colour-based and/or template based detection.

Alternatively or additionally, instead of using markers in the surrounding of the object or scene to scan it is proposed to use the housing of the scanner itself for positioning of a marker (not shown). The advantage of the proposal is again the knowledge of well-defined anchor points (feature points) tracked on the marker with respect to the coordinate system of the laser scanner, as the marker's position and orientation can be factory pre-calibrated. The workflow is similar to the one described above, where now the user during the second scan with the mobile camera has to ensure, that the scanner housing is seen at least once in a recorded image. Using an automatic (preferred) or manual detection algorithm for the marker, the position and orientation of the camera with relation to the coordinate system of the laser scanner is known, and subsequently, the generated point clouds (scanner and camera) can be merged easily.

Although the invention is illustrated above, partly with reference to some specific embodiments, it must be understood that numerous modifications and combinations of different features of the embodiments can be made and that the different features can be combined with measuring principles and/or surveying instruments known from prior art.

What is claimed is:

1. A method for providing a three dimensional (3D-) point cloud using a geodetic surveying instrument, the method comprising:

scanning a surrounding with the geodetic surveying instrument according to a defined scanning region;

generating a scanning point cloud corresponding to the scanning region with reference to a surveying coordinate system which is defined by the surveying instrument;

generating a first image on a side of the surveying instrument covering a region at least basically corresponding to the scanning region, the first image representing a reference image whereby a pose of the reference image is known with reference to the surveying coordinate system due to the position and orientation of the surveying instrument for acquiring data the first image is based on;

capturing a first series of at least two images with an image capturing unit, the images having respective poses and partly cover the scanning region and an imaging region; and applying a Structure-from-Motion- (SfM) or a Simultaneous Localization and Mapping- (SLAM-) algorithm at least comprising:

identifying a first set of image points based on the reference image and on the first series of at least two images, the image points representing a first set of reference points of a reference point field, wherein each point of the first set of reference points appears in the reference image and in at least one of the images of the first series of images and position information regarding the points of the first set of reference points is provided by the scanning point cloud, and determining the poses for the images of the first series of images with reference to the surveying coordinate system, using the first set of reference points and the position information, the poses representing respective positions and orientations of the image capturing unit relative to the surveying instrument at capturing the images of the first series of images.

2. The method according to claim 1, further comprising:
determining a second set of reference points in an imaging region based on the poses for the images of the first series of images, wherein
the imaging region is different from the scanning region, and
a position information regarding a 3D-position of at least one point of the second set of reference points is derived, the position information being referenced to the surveying coordinate system,
in particular wherein the scanning point cloud is actualised by adding the derived 3D-position information to the scanning point cloud.

3. The method according to claim 2, further comprising:
capturing a second series of at least one image with the image capturing unit, wherein the at least one image of the second series at least partly covers the second set of reference points and/or at least one point of the first set of reference points,
determining the pose for the at least one image of the second series with reference to the surveying coordinate system, using at least three reference points of the first and/or the second set of reference points covered with the at least one image and using respective position information.

4. The method according to claim 3, further comprising:
determining the pose for at least one image of the second series with reference to the surveying coordinate system solely using reference points of the second set of reference points.

5. The method according to claim 3, wherein:
at least one of the images of the second series of at least one image partly covers the scanning region, wherein a further reference point (T) is determined based on the reference image and the at least one of the images of the second series of at least one image.

6. The method according to claim 3, further comprising:
applying a bundle adjustment procedure based on the poses of the images of the first series of at least two images and second series of at least one image and the first and the second set of reference points.

7. The method according to claim 1, wherein:
computing an image point cloud for at least a part of the imaging region based on the poses of at least two of the images captured with the image capturing unit the image point cloud at least comprising 3D-position information according to a respective commonly covered region of the at least two captured images and being referenced with respect to the surveying coordinate system.

8. The method according to claim 7, wherein:
quality information concerning the position accuracy of points of the scanning point cloud and of points of the image point cloud is generated.

9. The method according to claim 8, wherein:
the quality information is displayed in an image,
wherein a first region representing the scanning point cloud is overlaid by a first marking and a second region representing the image point cloud is overlaid by a second marking, the markings being represented by regions of different colours, wherein
a region covered by both the scanning and the image point cloud is overlaid by a third marking or
the points of the region covered by both the scanning and the image point cloud are filtered so that only points of the scanning point cloud or only points of the image point cloud are provided, wherein the filtering is induced by an input of an operator.

10. The method according to claim 7, wherein the computing an image point cloud includes applying a dense-matching algorithm.

11. The method according to claim 1, further comprising:
compensating position errors occurring with calculating the 3D-position information or the poses of images on basis of scanning point cloud data, wherein the compensation is performed for each successive image data provided by successively captured images with the image capturing unit.

12. The method according to claim 1, wherein:
the surveying instrument and the image capturing unit being structurally separated from each other, wherein the images capturing unit is embodied as a mobile digital camera or provided by a mobile phone.

13. The method according to claim 12, wherein the geodetic surveying instrument comprises a laser scanner or total station.

14. The method according to claim 1, wherein:
the method being conducted directly and instantaneously during a measuring process, wherein data processing, the processing unit receiving data with respect to the:
scanning of the surrounding,
generating of the first image on the side of the surveying instrument, and
capturing of at least two further images with the image capturing unit.

15. The method according to claim 1, wherein:
a live-image is displayed on side of the image capturing unit imaging an actual field of view of the image capturing unit, wherein a region which both is actually imaged by the image capturing unit and covered or uncovered by the scanning point cloud is marked in the live-image, in particular wherein a part of the object being covered by one of the images captured with the image capturing unit is marked in the live-image.

16. One or more non-transitory computer-readable media storing one or more programs that are configured, when executed, to cause one or more processors to execute the method as recited in claim 1.

17. The method according to claim 1, wherein the data processing regarding the Structure-from-Motion- (SfM) or the SLAM-algorithm is performed by a processing unit during the measuring process.

18. A system for providing a three dimensional (3D-) point cloud comprising:
a geodetic surveying instrument;
a support structure being mounted on a base of the surveying instrument such that the support structure is pivotable about a first axis defined by the base;
a source of electromagnetic radiation for generating a measuring beam;

a directing unit for directing the measuring beam, the directing unit being arranged at the support structure as to provide pivotability of the directing unit about a second axis defined by the support structure, the second axis being basically perpendicular to the first axis;

a scanning functionality for providing directing and guiding of the measuring beam in a predefined manner and measuring distances correspondingly, wherein a surrounding according to a defined scanning region is measurable and wherein a scanning point cloud is producible based thereon with reference to a surveying coordinate system which is defined by the surveying instrument; and an image generation functionality for generating a first image, wherein a region at least basically corresponding to the scanning region is covered and wherein the first image represents a reference image whereby the pose of the reference image is known with reference to the surveying coordinate system due to the position and orientation of the surveying instrument for acquiring date the first image is based on:

an image capturing unit for capturing a first series of at least two images with respective poses, the first series of at least two images being capturable so that the scanning region is partly covered, the image capturing unit being structurally separated from the surveying instrument, and a controlling and processing unit for receiving and processing data from the surveying instrument and the image capturing unit, wherein:

the controlling and processing unit provides a Structure-from-Motion- (SfM) or a Simultaneous Localization and Mapping (SLAM)-algorithm being at least defined by providing execution of the steps of identifying a first set of image points based on the reference image and the first series of at least two images, the image points representing a first set of reference points of a reference point field, wherein each point of the first set of reference points appears in the reference image and in at least one of the images of the first series of image and position information regarding the first set of reference points is provided by the scanning point cloud, and determining a poses for the images of the first series of images with reference to the surveying coordinate system, using the first set of reference points and the position information, the poses representing positions and orientations of the image capturing unit relative to the surveying instrument at capturing the images of the first series of at least two images.

19. The system according to claim 18, wherein the geodetic surveying instrument comprises a laser scanner or total station.

20. The system according to claim 18, wherein determining a poses for the images of the first series of images with reference to the surveying coordinate system is based on resection.

* * * * *